US012311465B2

(12) United States Patent
Shinohara et al.

(10) Patent No.: US 12,311,465 B2
(45) Date of Patent: May 27, 2025

(54) 3D PRINTING APPARATUS, 3D PRINTING METHOD, AND MACHINE LEARNING DEVICE

(71) Applicant: Mitsubishi Electric Corporation, Tokyo (JP)

(72) Inventors: Nobuhiro Shinohara, Tokyo (JP); Daiji Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 779 days.

(21) Appl. No.: 17/634,250

(22) PCT Filed: Oct. 3, 2019

(86) PCT No.: PCT/JP2019/039157
§ 371 (c)(1),
(2) Date: Feb. 10, 2022

(87) PCT Pub. No.: WO2021/064952
PCT Pub. Date: Apr. 8, 2021

(65) Prior Publication Data
US 2022/0331904 A1   Oct. 20, 2022

(51) Int. Cl.
*B23K 26/342* (2014.01)
*B23K 9/04* (2006.01)
(Continued)

(52) U.S. Cl.
CPC ............. *B23K 26/342* (2015.10); *B23K 9/04* (2013.01); *B23K 9/10* (2013.01); *B23K 15/00* (2013.01);
(Continued)

(58) Field of Classification Search
CPC .......... B23K 26/342; B23K 9/04; B23K 9/10; B23K 15/00; B23K 26/702;
(Continued)

(56) References Cited

U.S. PATENT DOCUMENTS 10,981,325 B2    4/2021   Miyashita
2016/0009026 A1  1/2016   Kraibuhler et al.
(Continued)

FOREIGN PATENT DOCUMENTS

DE   10 2013 003 167 A1   8/2014
JP   2015-182419 A        10/2015
(Continued)

OTHER PUBLICATIONS

German Office Action issued Jan. 22, 2024, in corresponding German Patent Application No. 11 2019 007 777.5, 12 page.
(Continued)

*Primary Examiner* — Robert G Bachner
(74) *Attorney, Agent, or Firm* — XSENSUS LLP

(57) ABSTRACT

A machining program generation device that generates a machining program for controlling a 3D printing apparatus to form an object by stacking a plurality of layers, includes: a machining route generation unit that extracts a plurality of support points that are based on an end point, an intersection point, and a bending point of the machining path from machining path data indicating a shape and a position of the machining path for forming each of the plurality of layers, and generates a machining route by adding, to the machining path, an order of shaping indicating that shaping of the
(Continued)

support points is to be executed first and then shaping of a gap line segment connecting the plurality of support points shaped is to be executed; and a machining program generation unit that generates a machining program for controlling the 3D printing apparatus according to the machining route.

14 Claims, 14 Drawing Sheets

(51) Int. Cl.
| | | |
|---|---|---|
| B23K 9/10 | (2006.01) | |
| B23K 15/00 | (2006.01) | |
| B23K 26/70 | (2014.01) | |
| B33Y 10/00 | (2015.01) | |
| B33Y 30/00 | (2015.01) | |
| B33Y 50/02 | (2015.01) | |

(52) U.S. Cl.
CPC ............. *B23K 26/702* (2015.10); *B33Y 10/00* (2014.12); *B33Y 30/00* (2014.12); *B33Y 50/02* (2014.12)

(58) Field of Classification Search
CPC ............ B23K 26/0823; B23K 26/0853; B23K 26/14; B23K 26/1476; B23K 26/0006; B33Y 10/00; B33Y 30/00; B33Y 50/02; B22F 2999/00; B22F 10/25
See application file for complete search history.

(56) References Cited

U.S. PATENT DOCUMENTS

| | | |
|---|---|---|
| 2017/0106589 A1 | 4/2017 | Ishida et al. |
| 2019/0381595 A1 | 12/2019 | Yamasaki et al. |
| 2021/0308796 A1 | 10/2021 | Morita et al. |
| 2021/0316368 A1 | 10/2021 | Morita et al. |
| 2021/0323092 A1 | 10/2021 | Morita et al. |

FOREIGN PATENT DOCUMENTS

| | | |
|---|---|---|
| JP | 2018-149570 A | 9/2018 |
| JP | 2018-176597 A | 11/2018 |
| JP | 2019-60000 A | 4/2019 |
| WO | 2020/079816 A1 | 4/2020 |
| WO | 2020/079870 A1 | 4/2020 |
| WO | 2020/084715 A1 | 4/2020 |

OTHER PUBLICATIONS

International Search Report and Written Opinion mailed on Dec. 24, 2019, received for PCT Application PCT/JP2019/039157, Filed on Oct. 3, 2019, 8 pages including English Translation.

FIG.17

| CONTROL NUMBER | MACHINE PARAMETERS ||||||| BEAD DATA ||
| | BEAM DIAMETER [mm] | AXIAL FEED RATE [mm/min] | WIRE SUPPLY VOLUME VELOCITY [cc/h] | LASER OUTPUT [W] | WIRE ANGLE [deg] | IRRADIATION TIME (FOR BALL BEAD) [s] | BEAD WIDTH [mm] | BEAD HEIGHT [mm] |
|---|---|---|---|---|---|---|---|---|
| 1 | 3.0 | 133 | 25 | 1500 | 45.0 | - | 3 | 0.4 |
| 2 | 3.0 | 133 | 30 | 1500 | 45.0 | - | 3 | 0.6 |
| . | . | . | . | . | . | . | . | . |
| . | . | . | . | . | . | . | . | . |
| . | . | . | . | . | . | . | . | . |
| 1000 | 6.0 | 300 | 50 | 3000 | 60.0 | - | 3.4 | 0.3 |
| 1001 | 3.0 | 133 | 25 | 1500 | 45.0 | 0.1 | 3 | 0.1 |
| . | . | . | . | . | . | . | . | . |
| . | . | . | . | . | . | . | . | . |
| . | . | . | . | . | . | . | . | . |
| 2000 | 6.0 | 300 | 50 | 3000 | 60.0 | 0.5 | 3.4 | 0.2 |

3D PRINTING APPARATUS, 3D PRINTING METHOD, AND MACHINE LEARNING DEVICE

CROSS-REFERENCE TO RELATED APPLICATION

The present application is based on PCT filing PCT/JP2019/039157, filed Oct. 3, 2019, the entire contents of which are incorporated herein by reference.

FIELD

The present invention relates to a machining program generation device, a 3D printing apparatus, a machining program generation method, a 3D printing method, and a machine learning device for forming a three-dimensional object.

BACKGROUND

Additive manufacturing (AM) is a conventionally known technology for forming a three-dimensional object. Apparatuses that form a three-dimensional object using additive manufacturing technology are also referred to as 3D printing apparatuses. There are multiple types of additive manufacturing methods, among which directed energy deposition (DED) is superior to other additive manufacturing methods in terms of its short shaping time, easy switching of machining materials, and little restriction on base materials. In addition, DED reduces waste of machining material, and can use both powder and wire as machining materials by changing the configuration of the machining head. In particular, wire is inexpensively and easily available as ready-made welding wire.

In additive manufacturing, an uneven amount of machining material may be added depending on the shape of each of a plurality of layers constituting the object, resulting in the object having a height different from the target height. In this case, the formation accuracy of the object is reduced.

Patent Literature 1 discloses a DED-based 3D printing method. In the 3D printing method disclosed in Patent Literature 1, one welding robot for additive machining that executes additive machining and one welding robot for removal machining that executes removal machining are used. After the welding robot for additive machining performs additive machining, the height change of the object is detected. Then, if the detected height is lower than the target height, the welding robot for additive machining additionally performs additive machining, and if the detected height is higher than the target height, the welding robot for removal machining performs removal machining. This method makes it possible to form the object having a height close to the target height, and improve the formation accuracy of the object.

CITATION LIST

Patent Literature

Patent Literature 1: Japanese Patent Application Laid-open No. 2018-149570

SUMMARY

Technical Problem

However, the conventional technique described above requires the additional process in which it is determined whether to execute additive machining or removal machining depending on the height change of the object, and repeatedly performs removal machining after the additive machining of each layer, resulting in a problematic increase in shaping time.

The present invention has been made in view of the above, and an object thereof is to obtain a machining program generation device capable of improving shaping accuracy while preventing an increase in shaping time.

Solution to Problem

To solve the above-described problems and achieve the object, a machining program generation device according to the present invention that generates a machining program for controlling a 3D printing apparatus that forms an object by stacking a plurality of layers including a bead obtained by adding a machining material melted to a target surface while moving a machining position along a machining path, the machining program generation device includes: a machining route generation unit to extract a plurality of support points that are based on an end point, an intersection point, and a bending point of the machining path from machining path data indicating a shape and a position of the machining path for forming each of the plurality of layers, and generate a machining route by adding, to the machining path, an order of shaping indicating that shaping of the support points is to be executed first and then shaping of a gap line segment connecting the plurality of support points shaped is to be executed; and a machining program generation unit to generate a machining program for controlling the 3D printing apparatus according to the machining route.

Advantageous Effects of Invention

The present invention can achieve the effect of improving shaping accuracy while preventing an increase in shaping time.

BRIEF DESCRIPTION OF DRAWINGS

FIG. 17 is a diagram illustrating a process map as an example of a condition table that is used by a machining program generation device according to a fourth embodiment of the present invention.

DESCRIPTION OF EMBODIMENTS

Hereinafter, a machining program generation device, a 3D printing apparatus, a machining program generation method, a 3D printing method, and a machine learning device according to embodiments of the present invention will be described in detail with reference to the drawings. The present invention is not limited to the embodiments.

First Embodiment

Figure 1:
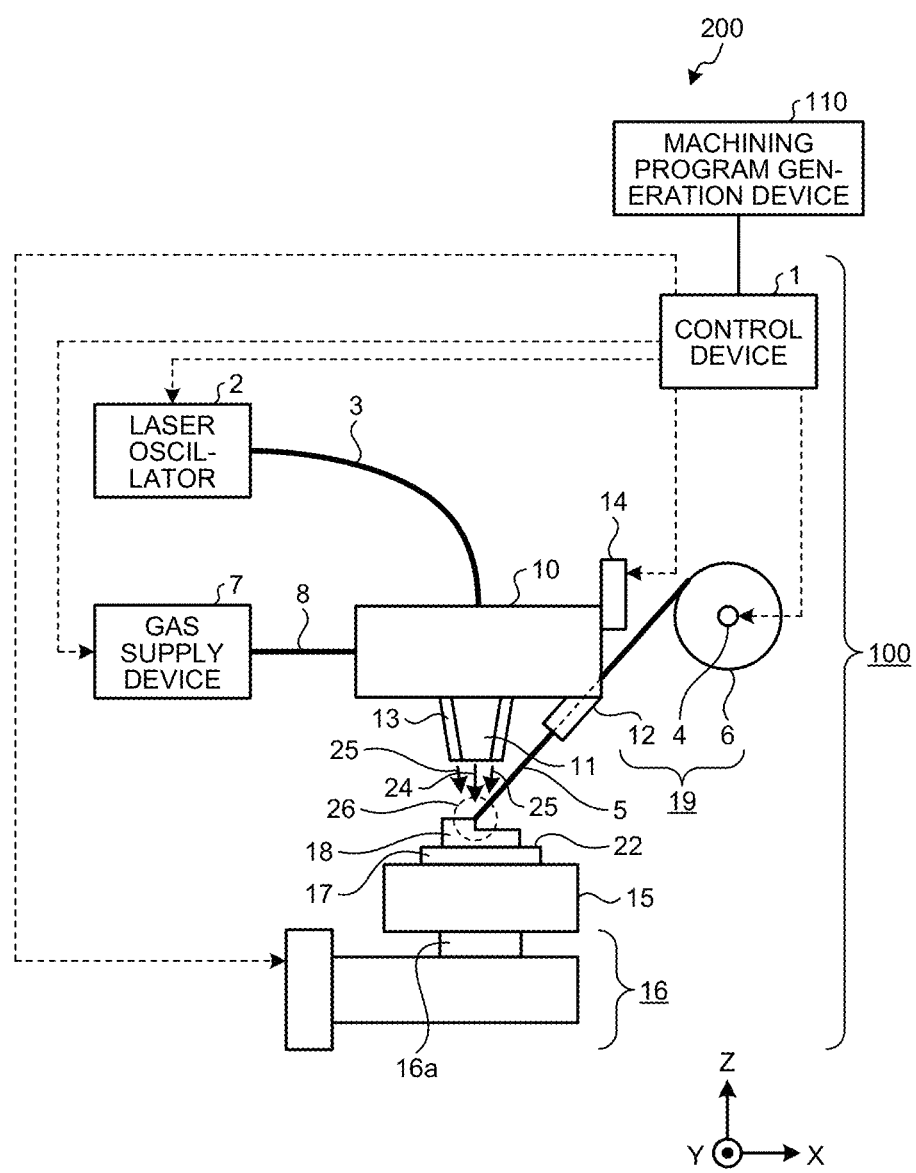
FIG. 1 is a diagram illustrating a configuration of a 3D printing system according to a first embodiment of the present invention.

FIG. 1 is a diagram illustrating a configuration of a 3D printing system 200 according to the first embodiment of the present invention. The 3D printing system 200 includes a 3D printing apparatus 100 and a machining program generation device 110. The 3D printing apparatus 100 is a DED-based additive manufacturing apparatus that manufactures a three-dimensional object 18 by repeating additive machining, i.e. adding a wire 5 melted by radiation of a beam to a target surface 22 of a workpiece. In the present embodiment, the beam is a laser beam 24, and the wire 5 is a wire-shaped metal, which is an example of a machining material. Note that a machining material other than metal may be used. The machining program generation device 110 is a computer-aided manufacturing (CAM) device that generates a machining program for controlling the 3D printing apparatus 100.

The 3D printing apparatus 100 forms the object 18 by stacking a plurality of layers including a bead obtained by adding a machining material melted to the target surface 22 while moving a machining position 26 along a machining path. The 3D printing apparatus 100 forms the object 18 of metal material on the target surface 22 of a base material 17 by adding beads to the base material 17. A bead is a solidified form of the wire 5 melted, and constitutes the object 18. In the present embodiment, the 3D printing apparatus 100 forms a bead having a ball shape or a bead having a line shape. Hereinafter, a bead having a ball shape is referred to as a ball bead, and a bead having a line shape is referred to as a line bead. In addition, shaping a ball bead is referred to as point shaping, and shaping a line bead is referred to as line shaping. That is, a ball bead is a ball-like metal into which the wire 5 is melted and then solidified, and a line bead is a linear metal into which the wire 5 is melted and then solidified.

The base material 17 is placed on a stage 15. The workpiece refers to the base material 17 and the object 18. The surface of the workpiece to which a bead is added is referred to as the target surface 22. The base material 17 illustrated in FIG. 1 has a plate shape. The base material 17 may have a shape other than the plate shape. The stage 15 is attached to a rotation member 16a of a rotation mechanism 16, and is rotated about a first axis or a second axis (described later) by the rotation mechanism 16. The second axis is perpendicular to the first axis.

The 3D printing apparatus 100 includes a machining head 10 that radiates the laser beam 24 to the machining position 26 to melt the wire 5, which is a machining material, and a head drive device 14 that moves the machining head 10. The machining head 10 includes a beam nozzle 11 that radiates the laser beam 24 to the machining position 26, a wire nozzle 12 that supplies the wire 5, which is a machining material, to the machining position 26, and a gas nozzle 13 that ejects a shield gas 25 to the machining position 26. The machining position 26 is a position on the target surface 22, and is an area to which the machining material is added. The machining position 26 is moved along the machining path during the additive machining process.

The beam nozzle 11 emits the laser beam 24, which is a heat source for melting the machining material, toward the machining position 26 on the workpiece. The energy source for melting the machining material may be an electron beam, arc discharge, or the like instead of the laser beam 24. The wire nozzle 12 causes the wire 5 to advance toward the irradiation position of the laser beam 24 on the workpiece. That is, the wire nozzle 12 supplies the wire 5 toward the machining position 26 on the target surface 22 of the workpiece.

Instead of supplying the wire 5 from the wire nozzle 12 to the machining position 26, the 3D printing apparatus 100 may employ a shaping method in which powder metal is ejected as machining material from the nozzle. In the case of using powder metal as machining material, it is possible to use a method of using the negative pressure of the shield gas, a method of pressure-injecting powder metal from a powder conveyance tube conveying the powder metal at a shaping timing, and the like. In this case, the nozzle for ejecting powder metal is placed such that the columnar central axis of the ejected powder metal corresponds to the central axis of the wire 5 supplied to the machining position 26. The wire 5 and the powder metal ejected in a columnar shape constitute a columnar machining material supplied from the nozzle to the machining position 26.

The gas nozzle 13 ejects, toward the machining position 26 on the target surface 22, the shield gas 25 for preventing oxidation of the object 18 and cooling line beads. The beam nozzle 11, the wire nozzle 12, and the gas nozzle 13 are fixed to the machining head 10, so that the positional relationship therebetween is uniquely determined. That is, the machining head 10 fixes the relative positional relationship between the beam nozzle 11, the wire nozzle 12, and the gas nozzle 13.

The 3D printing apparatus 100 further includes a control device 1 that controls the 3D printing apparatus 100 according to a machining program, a laser oscillator 2 that oscillates the laser beam 24 to be emitted from the beam nozzle 11 of the machining head 10, a wire supply unit 19 that supplies the wire 5 to the wire nozzle 12 of the machining head 10, and a gas supply device 7 that supplies the shield gas 25 to the gas nozzle 13 of the machining head 10. The laser oscillator 2 and the machining head 10 are connected by a fiber cable 3. The gas supply device 7 and the machining head 10 are connected by a pipe 8. The laser beam 24 generated by the laser oscillator 2 is supplied to the beam nozzle 11 via the fiber cable 3. The shield gas 25 is supplied from the gas supply device 7 to the gas nozzle 13 through the pipe 8.

The laser oscillator 2, the fiber cable 3, and the beam nozzle 11 constitute an irradiation unit that radiates the laser beam 24 for melting the wire 5 to the target surface 22 non-coaxially with the central axis of the wire 5. The gas supply device 7, the pipe 8, and the gas nozzle 13 constitute a gas supply unit that ejects the shield gas 25 to the machining position 26.

The wire 5 is wound around a wire spool 6, which is the supply source of machining material. The wire spool rotates as a rotary motor 4 which is a servomotor is driven, whereby the wire 5 is fed out from the wire spool 6. The wire 5 fed out from the wire spool 6 is passed through the wire nozzle 12 and supplied to the machining position 26. The rotary motor 4, the wire spool 6, and the wire nozzle 12 constitute the wire supply unit 19.

The head drive device 14 moves the machining head 10 in each of the X-axis direction, the Y-axis direction, and the Z-axis direction. The X axis, the Y axis, and the Z axis are three axes perpendicular to each other. The X axis and the Y axis are axes parallel to the horizontal direction. The Z-axis direction is the vertical direction. The head drive device 14 includes a servomotor constituting an operation mechanism for movement of the machining head 10 in the X-axis direction, a servomotor constituting an operation mechanism for movement of the machining head 10 in the Y-axis direction, and a servomotor constituting an operation mechanism for movement of the machining head 10 in the Z-axis direction. The head drive device 14 is an operation mechanism that enables translational movement in each of the three-axis directions. In FIG. 1, the servomotors are not illustrated. The 3D printing apparatus 100 can move the irradiation position of the laser beam 24 on the target surface 22 by moving the machining head 10 with the head drive device 14.

The machining head 10 illustrated in FIG. 1 causes the laser beam 24 to advance in the Z-axis direction from the beam nozzle 11. The wire nozzle 12 is provided at a position away from the beam nozzle 11 in the XY plane, and causes the wire 5 to advance in a direction oblique to the Z axis. That is, the wire nozzle 12 causes the wire 5 to advance non-coaxially with the laser beam 24 emitted from the beam nozzle 11. The wire nozzle 12 is used to limit the advance of the wire 5 such that the wire 5 is supplied to a desired position.

In the machining head 10, the gas nozzle 13 is provided coaxially with the beam nozzle 11 on the outer circumferential side of the beam nozzle 11 in the XY plane, and ejects the shield gas 25 along the central axis of the laser beam 24 emitted from the beam nozzle 11. That is, the beam nozzle 11 and the gas nozzle 13 are arranged coaxially with each other. Note that the machining head 10 may additionally include a swivel shaft. For example, the swivel shaft can be attached so as to be inclined to the X-axis center of the machining head 10. The use of the swivel shaft enables the machining head 10 to adjust the inclination angles of the A and B axes in the five-axis drive, so that the deposited object 18 does not need to be inclined. In a case where the object 18 is large and heavy, the inclination of the object 18 may make the movement of the 3D printing apparatus 100 unstable. Therefore, by using the swivel shaft, the heavy base material can be fixed in the vertical direction, and the stability can be improved.

Although not illustrated here, the wire nozzle 12 may be coaxial with the beam nozzle 11. This can be achieved with a configuration in which the wire nozzle 12 is placed at the center and the gas port of the gas nozzle 13 and the laser emission port of the beam nozzle 11 are arranged concentrically with the wire nozzle 12. In addition, a plurality of wire nozzles 12 may be arranged to surround the beam nozzle 11 such that the direction of laser running and the direction in which the wire 5 is supplied may be kept constant, or such that a plurality of different machining materials are supplied from the different wire nozzles 12.

Figure 2:
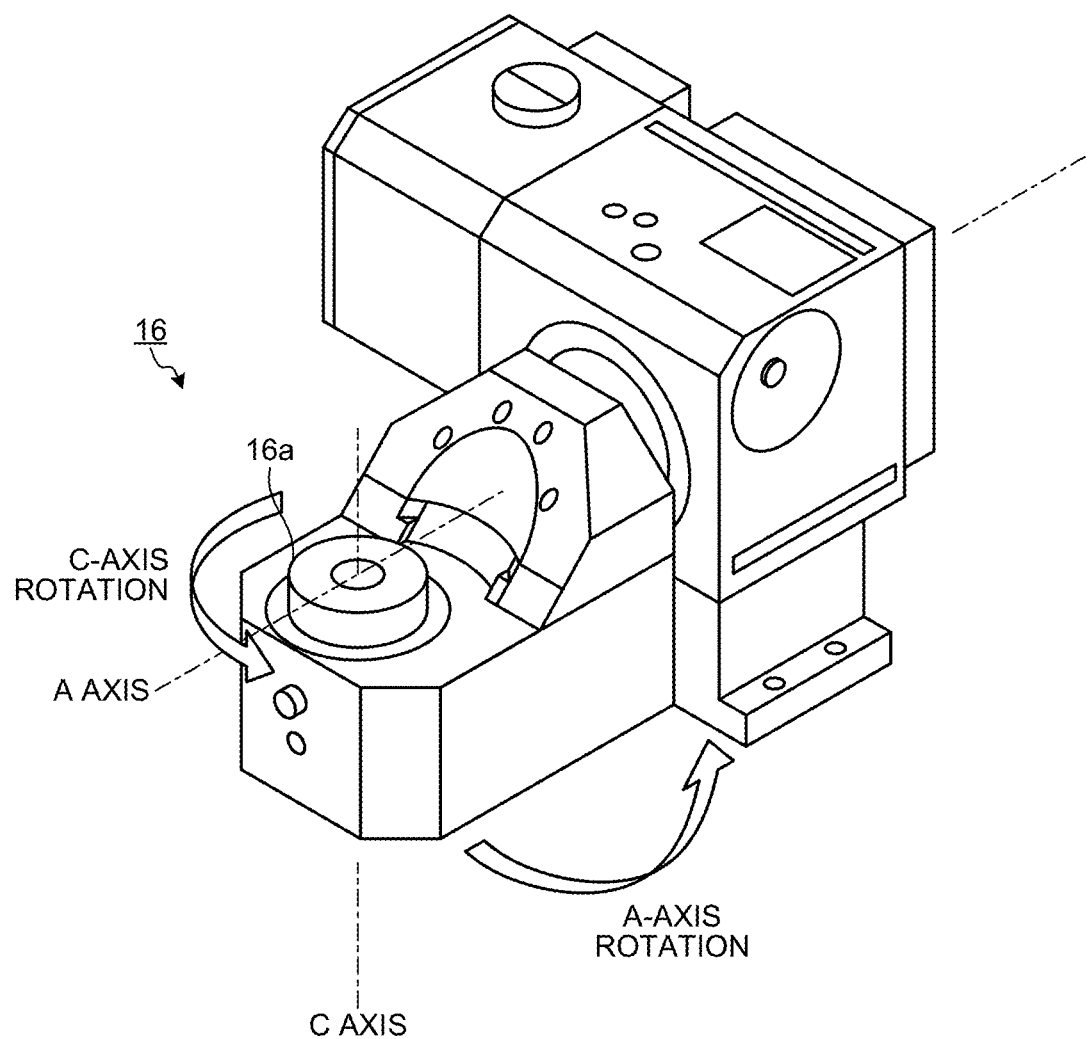
FIG. 2 is a diagram illustrating rotation directions of the rotation mechanism of the 3D printing apparatus illustrated in FIG. 1.

The rotation mechanism 16 is an operation mechanism that enables the stage 15 to rotate about the first axis and rotate about the second axis perpendicular to the first axis. In the rotation mechanism 16 illustrated in FIG. 1, the first axis is the A axis parallel to the X axis, and the second axis is the C axis parallel to the Z axis. The rotation mechanism 16 includes a servomotor constituting an operation mechanism for rotating the stage 15 about the first axis, and a servomotor constituting an operation mechanism for rotating the stage 15 about the second axis. The rotation mechanism 16 is an operation mechanism that enables rotational motion about each of the two axes. In FIG. 1, the servomotors are not illustrated. The 3D printing apparatus 100 can change the posture or position of the workpiece by rotating the stage 15 with the rotation mechanism 16. By using the rotation mechanism 16, complicated shapes having a tapered shape can be shaped. FIG. 2 is a diagram illustrating rotation directions of the rotation mechanism 16 of the 3D printing apparatus 100 illustrated in FIG. 1. The rotation mechanism 16 includes the rotation member 16a that rotates about the C axis, which is the second axis, and the stage 15 is attached to the rotation member 16a. With the rotation mechanism 16 illustrated in FIG. 2, the C-axis table itself including the rotation member 16a can be rotated in the A-axis direction.

The control device 1 controls the 3D printing apparatus 100 in accordance with a machining program transmitted from the machining program generation device 110. The machining program specifies a machining route, i.e. a route for shaping the solid object 18 according to a movement route instruction for moving the machining head 10 with respect to the workpiece placed on the stage 15, in other words, a route for moving the irradiation position of the laser beam 24.

The control device 1 controls the wire supply unit 19, the irradiation unit, and the gas supply unit to perform control for shaping the object 18 with a plurality of line beads formed by melting the wire 5. The control device 1 is, for example, a numerical control device. The control device 1 outputs a movement command to the head drive device 14 to control the driving of the head drive device 14 and move the machining head 10. The control device 1 controls laser oscillation by the laser oscillator 2 by outputting a command that depends on the condition of beam output to the laser oscillator 2.

The control device 1 controls the driving of the rotary motor 4 by outputting a command that depends on the condition of the amount of machining material supply to the rotary motor 4. The control device 1 adjusts the speed of the wire 5 going from the wire spool 6 toward the irradiation position by controlling the driving of the rotary motor 4. In the following description, the speed of the wire 5 going from the wire spool 6 toward the irradiation position may be referred to as a wire supply volume velocity.

The control device 1 controls the amount of supply of the shield gas 25 from the gas supply device 7 to the gas nozzle 13 by outputting a command that depends on the condition of the amount of gas supply to the gas supply device 7. The control device 1 controls the driving of the rotation mechanism 16 by outputting a rotation command to the rotation mechanism 16. That is, the control device 1 controls the entire 3D printing apparatus 100 by outputting various commands.

The control device 1 can change the machining position 26 by moving the machining head 10 and the stage 15 through coordinated operation of the head drive device 14 and the rotation mechanism 16, so that the object 18 having a desired shape can be obtained.

In the present embodiment, the control device 1 controls the machining head 10 according to the machining program, so that a plurality of support points that are based on the end, intersection, and bending points of the machining path for forming each of a plurality of layers constituting the object 18 can be shaped first, and then a gap line segment connecting the plurality of support points shaped can be shaped.

Figure 3:
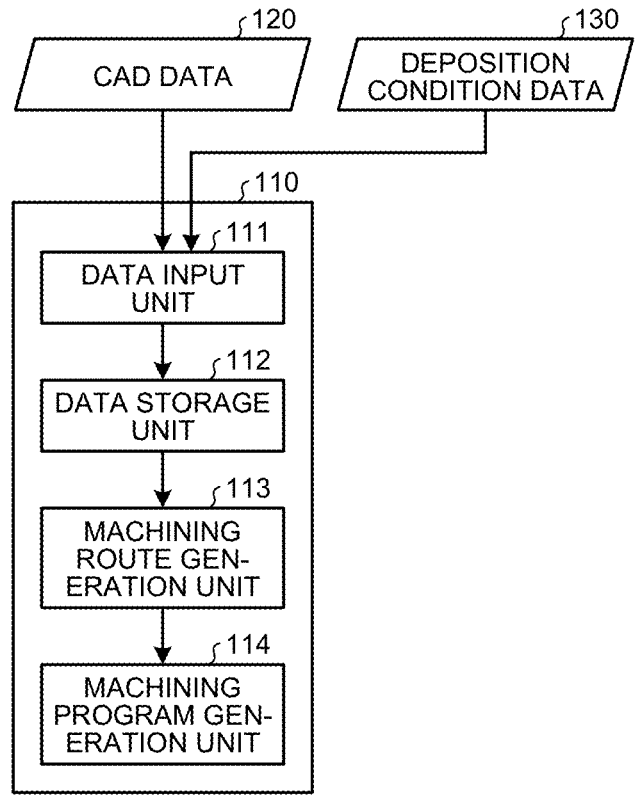
FIG. 3 is a diagram illustrating a functional configuration of the machining program generation device illustrated in FIG. 1.

FIG. 3 is a diagram illustrating a functional configuration of the machining program generation device 110 illustrated in FIG. 1. The machining program generation device 110 includes a data input unit 111, a data storage unit 112, a machining route generation unit 113, and a machining program generation unit 114. These components of the machining program generation device 110 can transmit and receive information to and from each other.

The data input unit 111 receives computer-aided design (CAD) data 120, i.e. design shape data input to the machining program generation device 110 from an external device located outside the machining program generation device 110, and transmits the CAD data 120 to the data storage unit 112. The design shape data include information of the shape to be formed, i.e. finished shape of the object 18 to be formed through additive manufacturing by the 3D printing apparatus 100, and information of the quality of material. The shape to be formed is a final three-dimensional shape. Note that the design shape data are not limited to the CAD data 120. The design shape data may be any data that can be interpreted by the machining program generation device 110.

In addition, the data input unit 111 receives deposition condition data 130 including line bead forming information or ball bead forming information, i.e. information of conditions for forming a line bead or a ball bead input by the user, and transmits the deposition condition data 130 to the data storage unit 112. The line bead forming information is information indicating the shape of a line bead for use in the generation of a machining program (described later). The line bead forming information includes information of the width of a line bead and information of the height of a line bead. The same applies to the ball bead forming information.

The data storage unit 112 stores the CAD data 120 and the deposition condition data 130 transmitted from the data input unit 111.

The machining route generation unit 113 receives the CAD data 120 transmitted from the data input unit 111.

The machining route generation unit 113 generates a machining route by analyzing the CAD data 120 and the deposition condition data 130, which are used to control the deposition of beads, and transmits the machining route to the machining program generation unit 114. The machining route is a route through which additive machining of line beads or ball beads is performed, in other words, a tool path for the machining head 10. The machining program describes the machining route by specifying the trajectory of the machining head 10 for forming line beads or ball beads.

The machining program generation unit 114 receives the machining route information transmitted from the machining route generation unit 113. The machining program generation unit 114 converts the machining route information generated by the machining route generation unit 113 into a machining program, and transmits the machining program to the control device 1.

Figure 4:
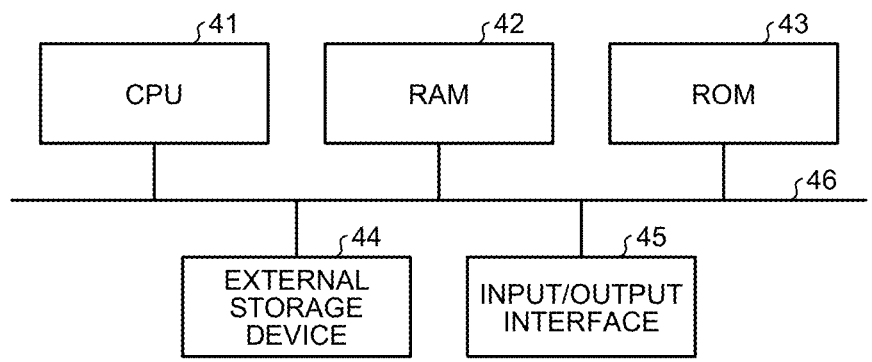
FIG. 4 is a diagram illustrating a first example of a hardware configuration for implementing the functions of the control device illustrated in FIG. 1.

FIG. 4 is a diagram illustrating a first example of a hardware configuration for implementing the functions of the control device 1 illustrated in FIG. 1. The control device 1 is implemented using a control program that is a program for executing control over the 3D printing apparatus 100.

The control device 1 includes a central processing unit (CPU) 41 that executes various processes, a random access memory (RAM) 42 including a data storage area, a read only memory (ROM) 43 that is a non-volatile memory, an external storage device 44, and an input/output interface 45 for inputting information to the control device 1 and outputting information from the control device 1. The components illustrated in FIG. 4 are connected to one another via a bus 46.

The CPU 41 executes programs stored in the ROM 43 and the external storage device 44. The overall control of the 3D printing apparatus 100 by the control device 1 is implemented using the CPU 41.

The external storage device 44 is a hard disk drive (HDD) or a solid state drive (SSD). The external storage device 44 stores the control program and various data. The ROM 43 stores software or a program for controlling hardware that is a boot loader such as Basic Input/Output System (BIOS) or Unified Extensible Firmware Interface (UEFI), which is a program for controlling the basic operation of the computer or controller, namely the control device 1. Note that the control program may be stored in the ROM 43.

Programs stored in the ROM 43 and the external storage device 44 are loaded into the RAM 42. The CPU 41 develops the control program in the RAM 42 and executes various processes. The input/output interface 45 is an interface for connection with a device outside the control device 1. A machining program is input to the input/output interface 45. The input/output interface 45 outputs various commands. The control device 1 may include an input device such as a keyboard and a pointing device, and an output device such as a display.

The control program may be recorded on a storage medium readable by the computer. The control device 1 may cause the external storage device 44 to store the control program recorded on the storage medium. The storage medium may be a portable storage medium which is a flexible disk or a flash memory which is a semiconductor memory. The control program may be installed from another computer or a server device to the computer or controller which is the control device 1 via a communication network.

Figure 5:
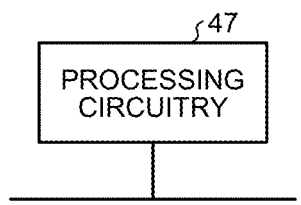
FIG. 5 is a diagram illustrating a second example of a hardware configuration for implementing the functions of the control device illustrated in FIG. 1.

FIG. 5 is a diagram illustrating a second example of a hardware configuration for implementing the functions of the control device 1 illustrated in FIG. 1. The functions of the control device 1 can also be implemented by processing circuitry 47 which is dedicated hardware illustrated in FIG. 5. The processing circuitry 47 is a single circuit, a composite circuit, a programmed processor, a parallel programmed processor, an application specific integrated circuit (ASIC), a field programmable gate array (FPGA), or a combination thereof. Note that some of the functions of the control device 1 may be implemented by dedicated hardware, and the other functions may be implemented by software or firmware.

Note that the functions of the machining program generation device 110 can be implemented by a control program that is a program for executing control over the machining program generation device 110 being executed on hardware having a configuration such as the one illustrated in FIG. 4. In addition, the functions of the machining program generation device 110 may be implemented using the processing circuitry 47 which is dedicated hardware as illustrated in FIG. 5.

Described below is a decrease in shaping accuracy that may occur at an end point, an intersection point, or the like of a straight line when the 3D printing apparatus 100 illustrated in FIG. 1 performs linear additive machining by moving the machining head 10 in parallel with the XY plane.

Figure 6:
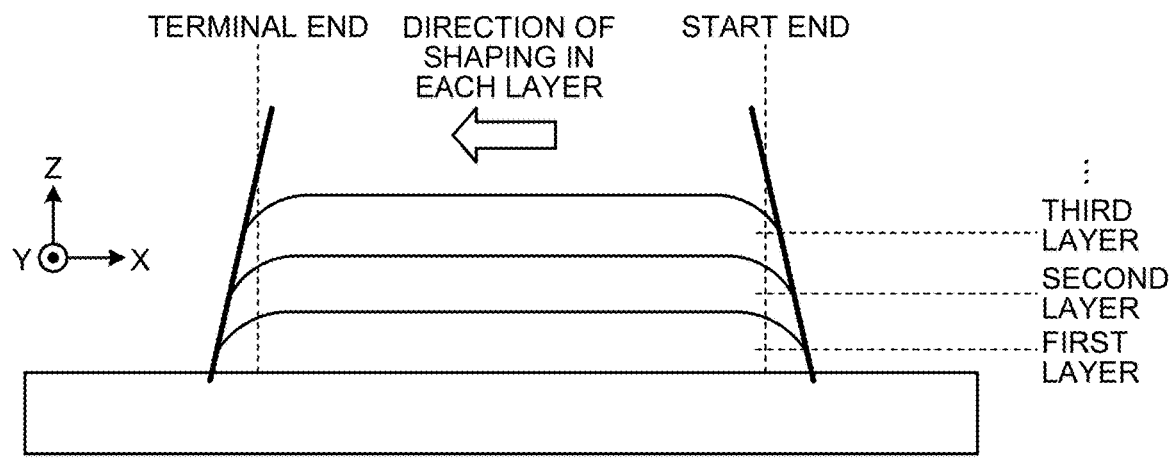
FIG. 6 is a diagram in which the 3D printing apparatus illustrated in FIG. 1 stacks a plurality of linear beads having the same length along the Z-axis direction.

FIG. 6 is a diagram in which the 3D printing apparatus 100 illustrated in FIG. 1 stacks a plurality of linear beads having the same length along the Z-axis direction. As illustrated in FIG. 6, molten machining material at the machining position has the property of being drawn toward an adjacent portion that has already been shaped. For this reason, when one line segment is shaped sequentially along a fixed direction from the start end toward the terminal end, the start end and the terminal end, which have no adjacent portion that has already been shaped, experience a force pulling toward the inside of the line segment, often resulting in an inclined shape. In addition, molten metal at the start end and the terminal end of lower linear bead layers flows outward due to the viscosity or surface tension of the liquid, and its shape affects upper linear bead layers. For this reason, start-end and terminal-end verticality gradually deteriorates as layers are stacked up. Even when all parts are shaped using ball beads, this phenomenon occurs similarly.

Figure 7:
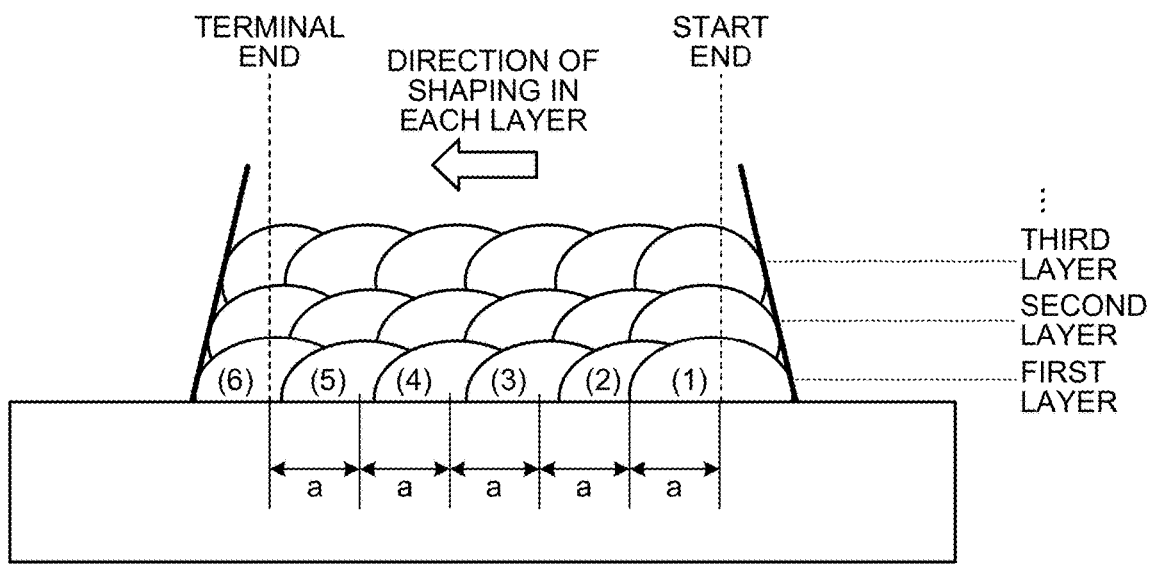
FIG. 7 is a diagram in which the 3D printing apparatus illustrated in FIG. 1 stacks ball beads arranged in a fixed direction from the start end toward the terminal end.

FIG. 7 is a diagram in which the 3D printing apparatus 100 illustrated in FIG. 1 stacks ball beads arranged in a fixed direction from the start end toward the terminal end. In FIG. 7, numbers (1) to (6) added to ball beads indicate the order in which these ball beads are shaped. As described above, molten machining material at the machining position has the property of being drawn toward an adjacent portion that has already been shaped. Therefore, ball beads that are sequentially shaped in the order (1) to (6) as illustrated in FIG. 7 experience a force pulling toward an adjacent ball bead that has already been shaped. Specifically, the second ball bead (2) shaped experiences a force toward the first ball bead (1) shaped. In the example illustrated in FIG. 7, the interval between adjacent ball beads is "a" which is a constant value. However, regarding the flatness of the intermediate line segment to be formed with ball beads, the ratio of overlap between adjacent ball beads can be adjusted according to the type of machining material and ball size, so that overall changes in height can be prevented. However, at an end point of the machining path, where there is no right or left ball bead, a hemispherical inclined surface appears independently. Due to the pulling force between ball beads, molten machining material flows outward, resulting in the hemispherical shape of the inclined surface collapsing and spreading outward. In this case, at the time of shaping upper ball bead or line bead layers, molten metal flows along the slopes present at the end points of lower layers, causing changes in height per ball bead. Therefore, end-point verticality deteriorates as layers are stacked up.

Figure 8:
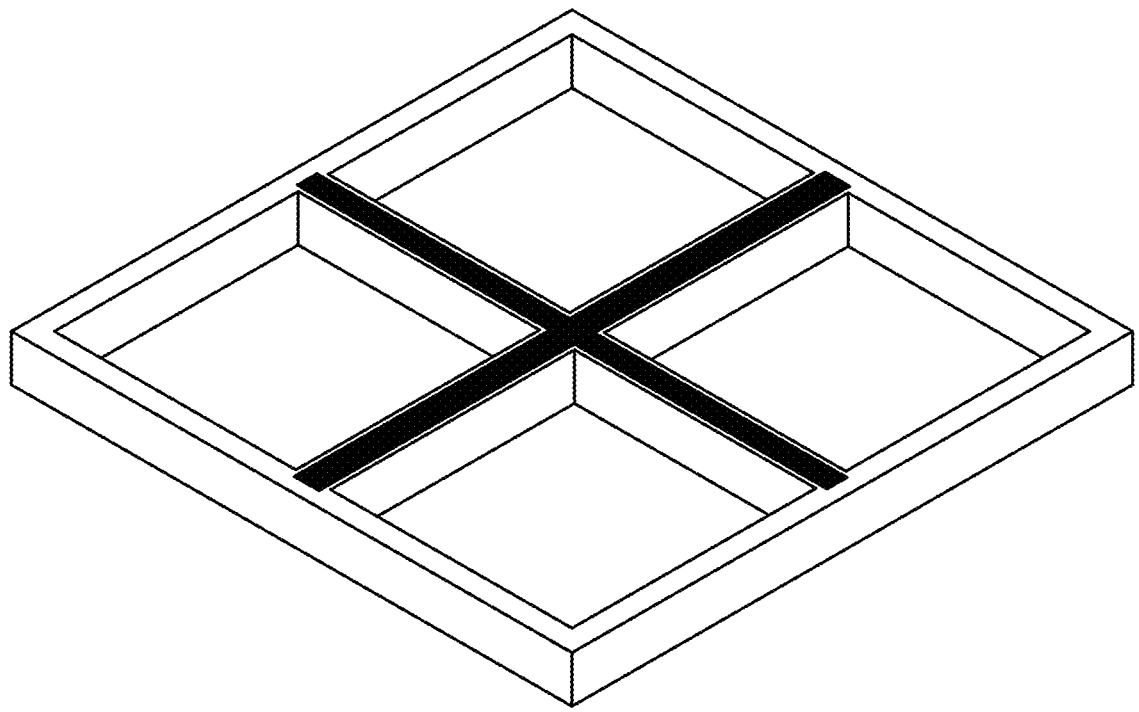
FIG. 8 is a diagram illustrating an example of a design shape including a machining path intersection.
Figure 9:
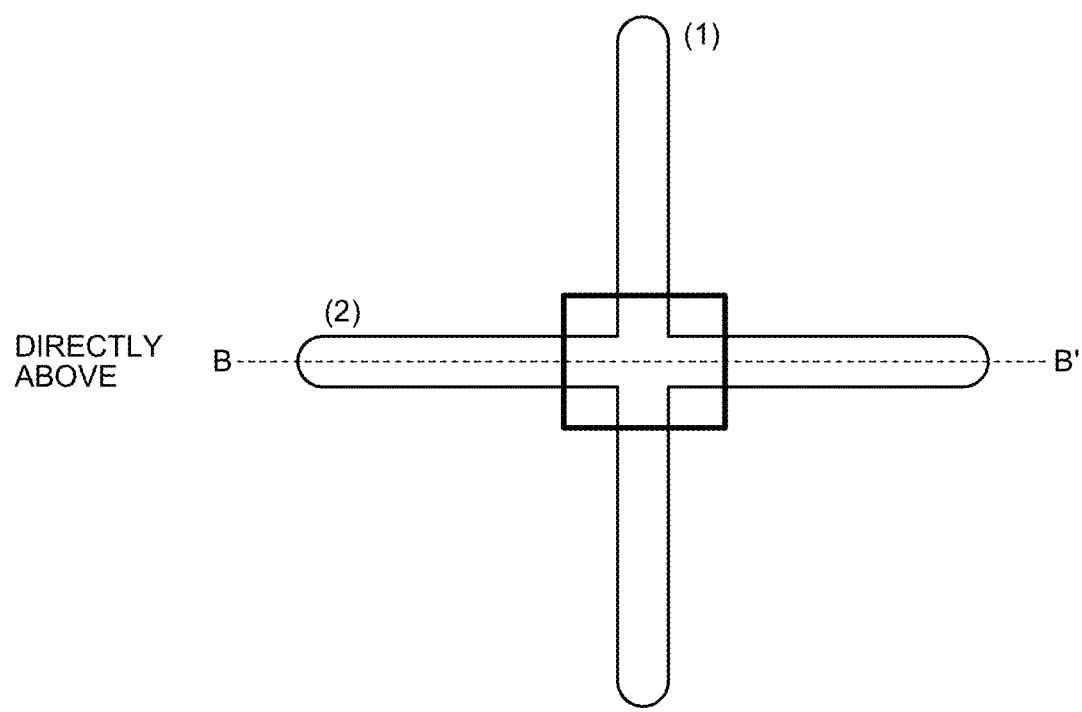
FIG. 9 is a top plan illustrating the machining path intersecting part illustrated in FIG. 8.
Figure 10:
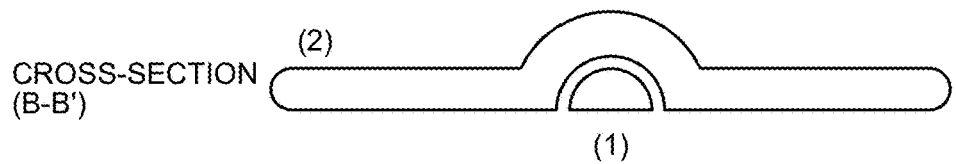
FIG. 10 is a cross-section taken along line B-B' of FIG. 9.

FIG. 8 is a diagram illustrating an example of a design shape including a machining path intersection. FIG. 9 is a top plan illustrating the machining path intersecting part illustrated in FIG. 8. FIG. 10 is a cross-section taken along line B-B' of FIG. 9. In the presence of a machining path intersection such as the one illustrated in FIG. 8, if the intersecting part is shaped with two straight lines, the intersection has a higher bead height than the other parts as illustrated in FIGS. 9 and 10. Here, it is possible to reduce the difference in bead height at the intersection by preferentially shaping either of the two intersecting straight lines. In this case, however, the problem at an end point of linear shaping occurs similarly: molten metal flows outward due to the viscosity or surface tension of the liquid, leading to a deterioration in shaping accuracy.

In many cases, changes in height per layer are as small as several $\mu$m to several tens of $\mu$m, but as several tens or several hundreds of layers are stacked up to form a desired shape, differences in height are accumulated to exert a significant influence on the final shape.

In view of this, the 3D printing apparatus 100 according to the present embodiment first shapes a plurality of support points that are based on the end, intersection, and bending points of the machining path, and then shapes a gap line segment connecting the plurality of support points shaped, as described below, whereby shaping accuracy can be improved.

Figure 11:
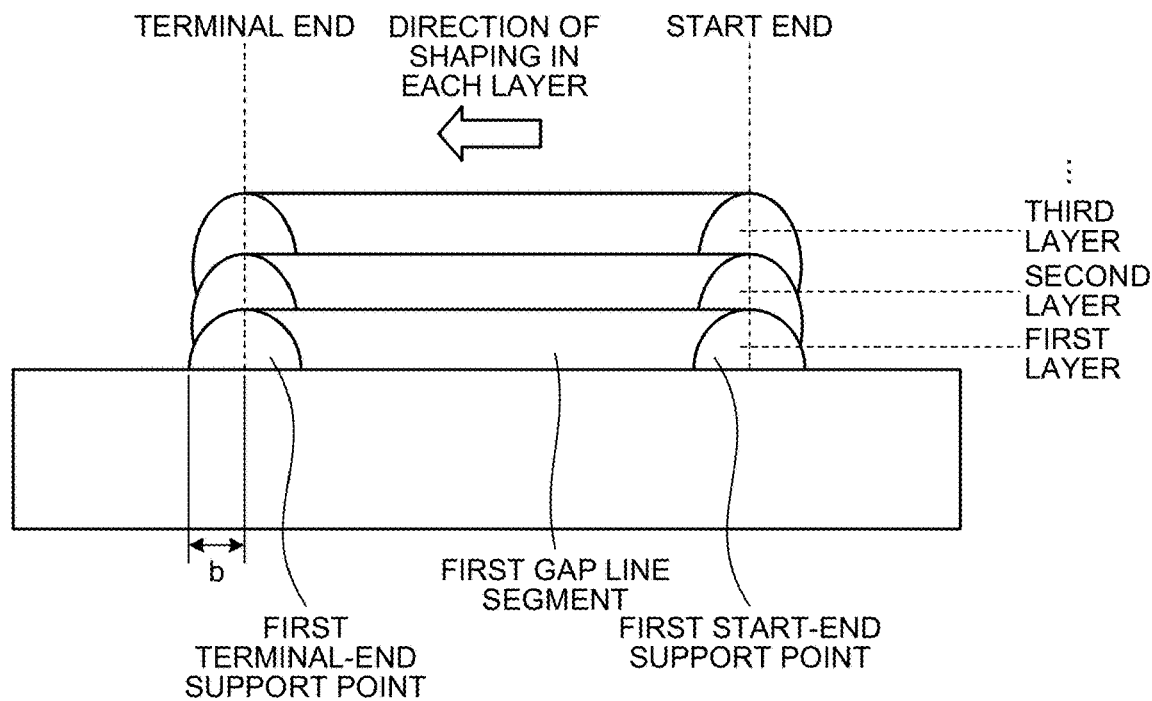
FIG. 11 is a diagram illustrating an example of a machining route that is used by the 3D printing apparatus illustrated in FIG. 1.

FIG. 11 is a diagram illustrating an example of a machining route that is used by the 3D printing apparatus 100 illustrated in FIG. 1. As illustrated in FIG. 11, in the case of shaping along a machining path including end points: a start end and a terminal end, the 3D printing apparatus 100 first shapes each layer by shaping a start-end support point which is a support point centered on the start end of the machining path and a terminal-end support point which is a support point centered on the terminal end of the machining path, and then shapes a gap line segment connecting the start-end support point and the terminal-end support point. Here, the start-end support point of the first layer is referred to as the first start-end support point, the terminal-end support point of the first layer is referred to as the first terminal-end support point, and the gap line segment of the first layer is referred to as the first gap line segment.

At this time, the 3D printing apparatus 100 performs point shaping to form a plurality of support points, that is, the start-end support point and the terminal-end support point. That is, support points are shaped with beads having a ball shape. The support points in this example are shaped with beads having a ball shape of the radius b.

The first start-end support point, first terminal-end support point, and first gap line segment of the first layer are parts of the machining path formed by dividing the machining path of the first layer. The 3D printing apparatus 100 shapes the first start-end support point and the first terminal-end support point through point shaping. Consequently, support points are produced at the start end and the terminal end in each machining path, and the first gap line segment therebetween is shaped through line shaping, during which process it is possible to prevent the occurrence of shear droop. Regarding the machining conditions for support points, point shaping is performed to form a point having the same height as the shape formed under the machining conditions of line shaping or point shaping used in the shaping of the first gap line segment. The radius b only needs to be a value within the acceptable range of error from the desired shape, or a value within the acceptable range of grinding thickness for finish processing.

Figure 12:
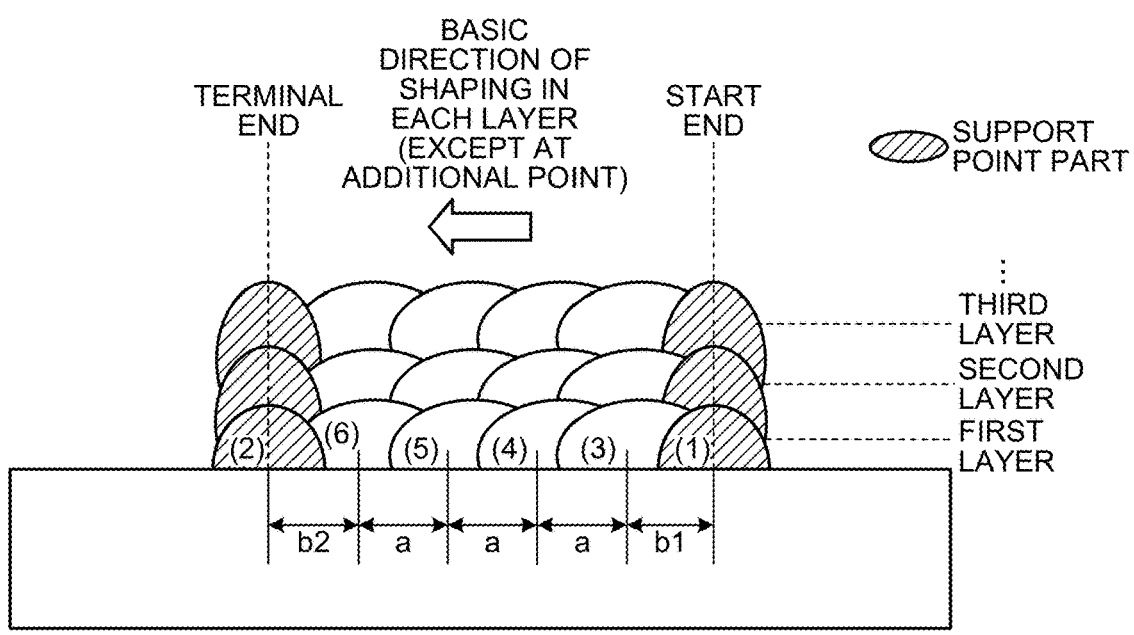
FIG. 12 is a diagram illustrating an example in which the gap line segment illustrated in FIG. 11 is shaped through point shaping.

FIG. 12 is a diagram illustrating an example in which the gap line segment illustrated in FIG. 11 is shaped through point shaping. In FIG. 12, numbers (1) to (6) added to ball beads indicate the order in which these ball beads are shaped. In the present embodiment, after support points are shaped at the start end and the terminal end, a gap line segment is shaped connecting the plurality of shaped support points. Here, when there is no object 18 adjacent to a support point, molten machining material supplied to the support point flows evenly to both sides. In this example, the first ball bead (1) is shaped at the start end, then the second ball bead (2) is shaped at the terminal end away from the start end, and thereafter the third ball bead (3) is shaped at the position adjacent to the first ball bead (1). Therefore, the solidification of the first ball bead (1) may have progressed by the time the third ball bead (3) is shaped. Thus, even though the third ball bead (3) experiences a force pulling toward the first ball bead (1), the first ball bead (1) has started to solidify in a bilaterally symmetrical pattern, forming a stabilized shape. For this reason, it is desirable that the shaping of a gap line segment be started at the portion adjacent to the support point shaped earlier, not at the support point shaped last. In addition, the second ball bead (2) has already been shaped at the terminal end by the time the sixth ball bead (6) is shaped; therefore, the machining material for shaping the sixth ball bead (6) is likely to flow evenly to both sides, forming a stabilized shape.

Figure 13:
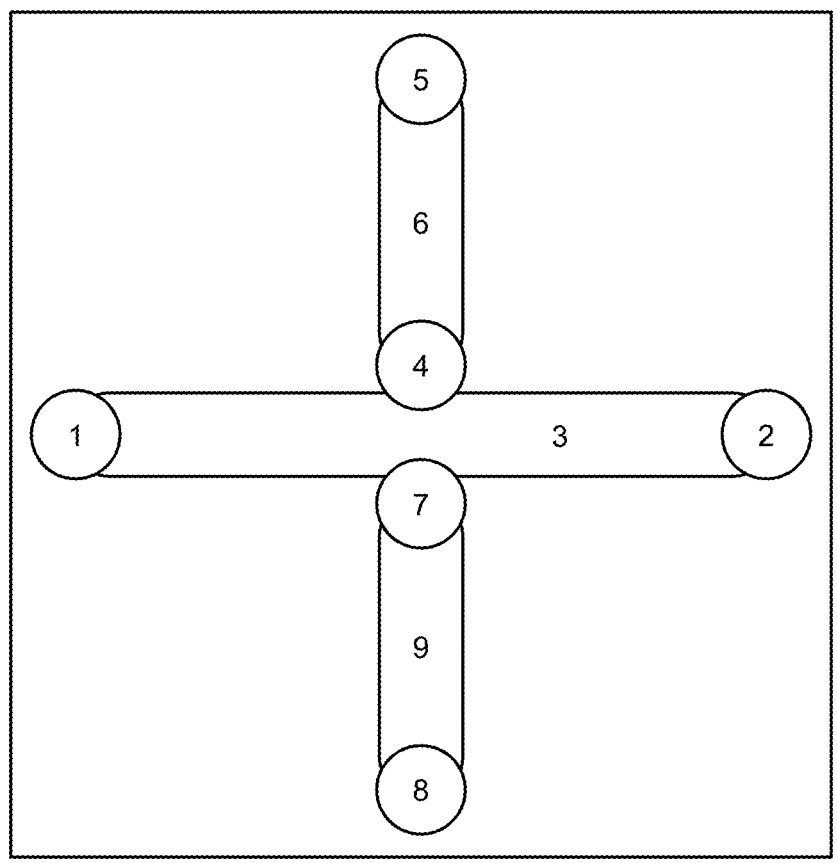
FIG. 13 is a diagram illustrating an example of the order in which the 3D printing apparatus illustrated in FIG. 1 shapes the machining path illustrated in FIG. 9.

FIG. 13 is a diagram illustrating an example of the order in which the 3D printing apparatus 100 illustrated in FIG. 1 shapes the machining path illustrated in FIG. 9. In order to shape a machining path having an intersection point, the 3D printing apparatus 100 selects one of the two intersecting line segments, and shapes the start-end support point and the terminal-end support point of the selected line segment and a gap line segment connecting the start-end support point and the terminal-end support point. The numerical values in FIG. 13 indicate the order of shaping. In FIG. 13, "1", "2", and "3" respectively indicate the start-end support point, the terminal-end support point, and the gap line segment, which are shaped in this order.

Thereafter, the 3D printing apparatus 100 shapes the remaining portions of the machining path excluding the shaped portions. At this time, the 3D printing apparatus 100 shapes support points at a position in contact with the intersecting portion of the shaped beads and at an end point, and then shapes a gap line segment connecting the plurality of shaped support points. The numbers "4", "5", and "6" respectively indicate the support point at the position in contact with the intersecting portion of the shaped beads, the end point, and the gap line segment, which are shaped in this order.

Furthermore, the 3D printing apparatus 100 shapes support points at the position in contact with the intersecting portion of the shaped beads on the opposite side of the fourth support point shaped and at an end point, and then shapes a gap line segment connecting the plurality of shaped support points. The numbers "7", "8", and "9" respectively indicate the support point at the position in contact with the intersecting portion of the shaped beads, the end point, and the gap line segment, which are shaped in this order.

In FIG. 13, the 3D printing apparatus 100 first shapes a pair of support points and immediately thereafter shapes a gap line segment connecting the pair of support points, but the present embodiment is not limited to this example. The support points may be shaped at any time before the gap line segment is formed. For example, the 3D printing apparatus 100 may collectively perform point shaping to form all of a plurality of support points of each layer, and then shape gap line segments.

In addition, the 3D printing apparatus 100 can shape a gap line segment using point shaping and/or line shaping. For example, the 3D printing apparatus 100 may shape a gap line segment using only point shaping, or may shape a gap line segment using only line shaping. Moreover, the 3D printing apparatus 100 can also shape a gap line segment using point shaping and line shaping according to machining conditions.

Figure 14:
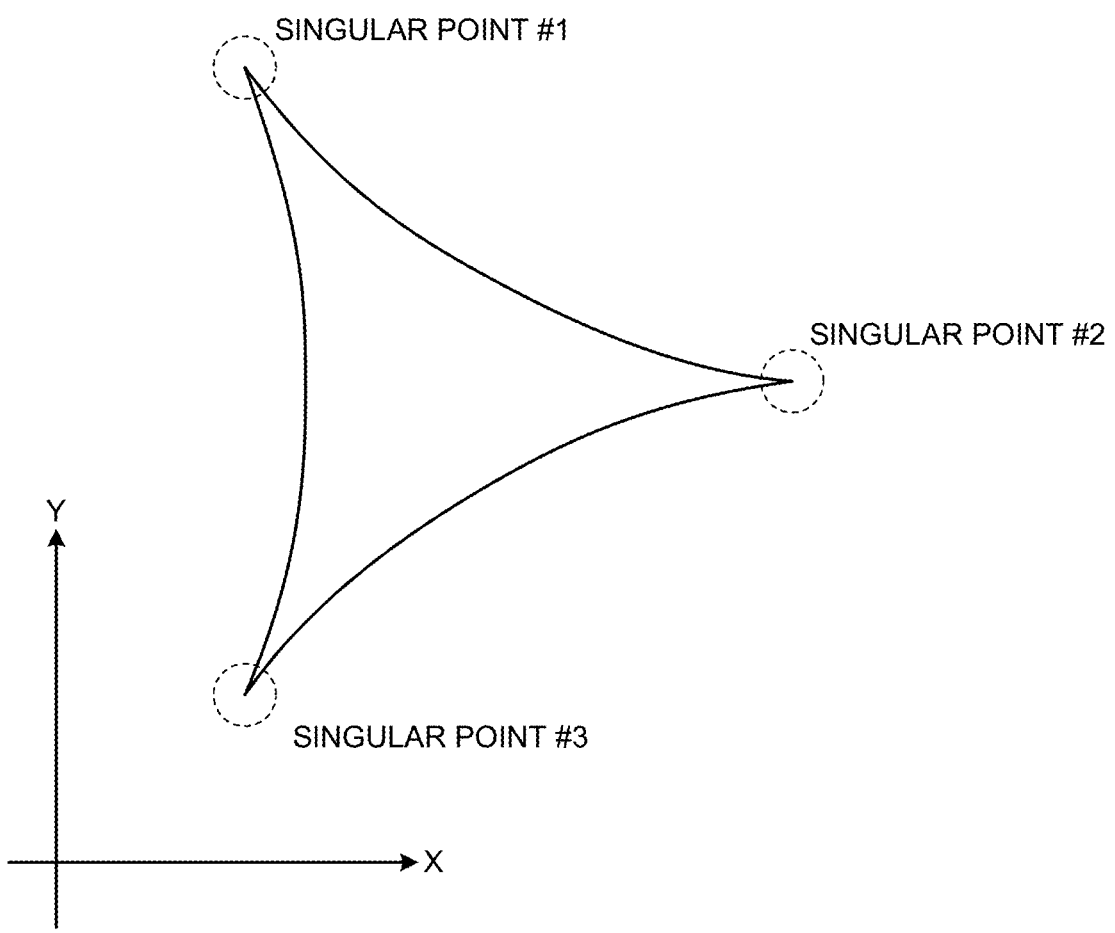
FIG. 14 is a diagram illustrating an example of the shape of a machining path having singular points at corners.

In the above description, the method of improving shaping accuracy at end points including a start end and a terminal end and an intersection point has been described. However, a phenomenon similar to that which occurs at end and intersection points also occurs at a bending point at a corner of a machining path due to the influence of the acceleration/deceleration of the machining head 10. FIG. 14 is a diagram illustrating an example of the shape of a machining path having singular points at corners. The machining path illustrated in FIG. 14 has three singular points: singular point #1, singular point #2, and singular point #3. Here, the term "singular point" refers to a point at which two line segments of the machining path share one tangent, and is also called a cusp. As the head drive device 14 accelerates and decelerates the machining head 10 in the XY axes, the axial movement for shaping makes instantaneous, temporary stops at singular points, and such temporary stops are repeated in each layer, making the final height of the object 18 uneven. To address this problem, if the line bead is simply divided at the singular points, a phenomenon similar to that which occurs in the shaping of a line including a start end and a terminal end occurs.

Therefore, the 3D printing apparatus 100 shapes bending points such as singular points in the same manner as shaping end and intersection points: shapes a support point that is based on a bending point, specifically, a support point centered on the bending point, with a bead having a ball shape, and shapes a segment between support points through line shaping or point shaping.

As described above, according to the first embodiment of the present invention, the 3D printing apparatus 100 shapes support points first and then shapes a gap line segment connecting the plurality of shaped support points. Therefore, the shape of beads is easily stabilized, and shaping accuracy can be improved. This can be achieved simply by changing the order of shaping; therefore, it is possible to improve shaping accuracy while preventing an increase in shaping time.

Specifically, in the present embodiment, a support point that is based on an intersection point of a machining path, e.g. a support point in contact with the intersection point, is shaped first, and then a gap line segment connecting a plurality of shaped support points is shaped. Therefore, there is no bead overlap in the intersection point such as the one illustrated in FIG. 10, and a change in bead height at the intersection point can be prevented.

In addition, in the present embodiment, a support point that is based on a bending point of a machining path, e.g. a support point centered on the bending point, is shaped first, and then a gap line segment connecting a plurality of shaped support points is shaped. Therefore, the axial movement does not make a temporary stop at the bending point, and a change in bead height at the bending point can be prevented.

In addition, in the present embodiment, a support point that is based on an end point of a machining path, e.g. a support point centered on the end point, is shaped first, and then a gap line segment connecting a plurality of shaped support points is shaped. Therefore, molten machining material at the end point is prevented from flowing outward so that the shape of the end point is stabilized, and a change in bead height at the end point can be prevented.

Second Embodiment

The first embodiment has described the 3D printing apparatus 100 that first shapes support points that are based on end, intersection, and/or bending points included in a machining path, and then shapes a gap line segment connecting the shaped support points. The second embodiment describes a machining program generation method for generating a machining program for causing the 3D printing apparatus 100 to implement the 3D printing method described in the first embodiment.

Figure 15:
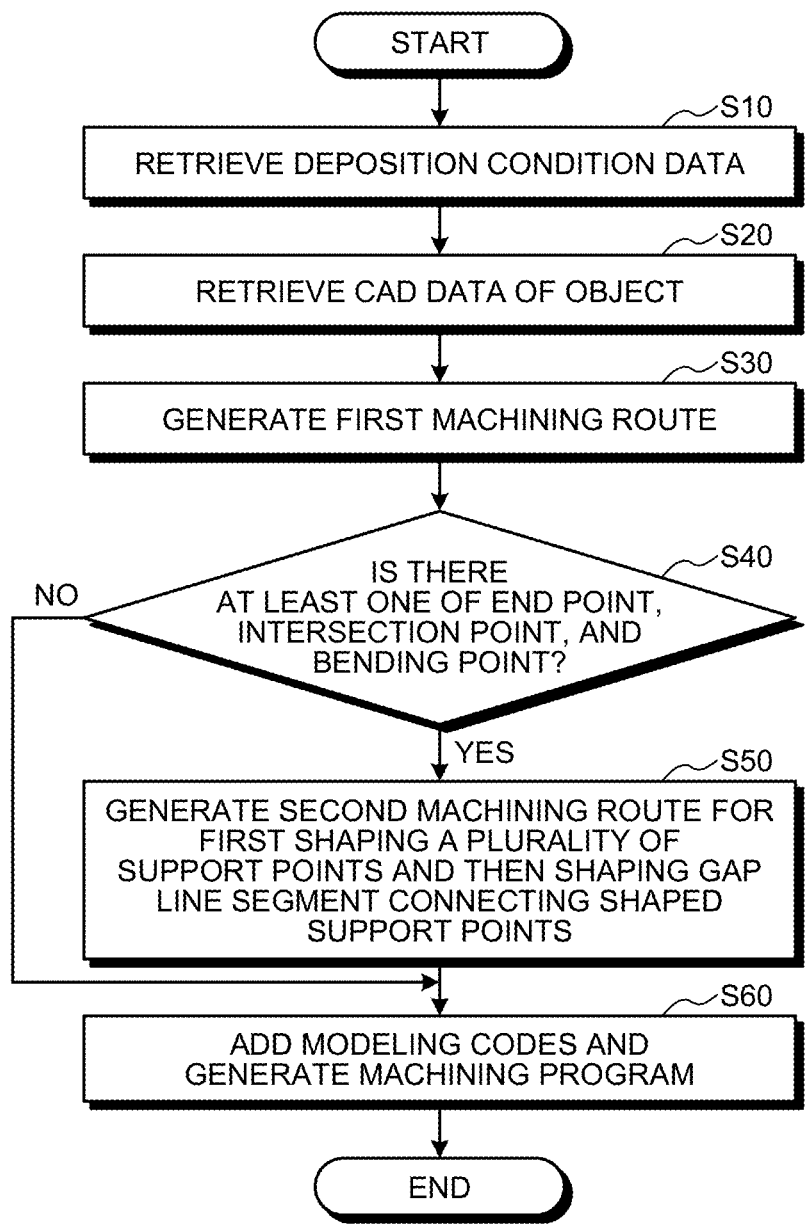
FIG. 15 is a flowchart illustrating a procedure for machining program generation processing that is executed by a machining program generation device according to a second embodiment of the present invention.

This machining program generation method is executed in the machining program generation device 110 illustrated in FIGS. 1 and 3. FIG. 15 is a flowchart illustrating a procedure for machining program generation processing that is executed by the machining program generation device 110 according to the second embodiment of the present invention.

The basic premise of the processing illustrated in FIG. 15 is that the machining program generation device 110 has received at the data input unit 111 the deposition condition data 130 input by the user, and stored the received deposition condition data 130 in the data storage unit 112. Similarly, the machining program generation device 110 has received the CAD data 120 at the data input unit 111, and stored the received CAD data 120 in the data storage unit 112.

The machining route generation unit 113 of the machining program generation device 110 retrieves the deposition condition data 130 from the data storage unit 112 (step S10). The deposition condition data 130 include parameters that the 3D printing apparatus 100 uses when performing additive machining, e.g. deposition pitch, bead width, laser output upper limit, laser focal length, laser diameter, wire supply speed, material of the wire 5, and movable shaft configuration.

The machining route generation unit 113 retrieves the CAD data 120 of the object from the data storage unit 112 (step S20).

The machining route generation unit 113 generates a first machining route as a basic machining route based on the shape to be formed indicated by the CAD data 120 and the deposition condition data 130 (step S30). Here, the first machining route is a route for moving the machining head 10 in order to form the shape to be formed in each layer: in the case of shaping a line segment, a route for sequential shaping from the start end toward the terminal end. For example, in a machining path having a start end and a terminal end, the direction of shaping is the direction from the start end toward the terminal end as illustrated in FIG. 6. For a machining path having an intersection point, the route for shaping includes overlapping lines of beads, as illustrated in FIGS. 9 and 10.

The machining route generation unit 113 determines, based on the CAD data 120, whether the first machining route includes at least one of an end point, an intersection point, and a bending point from the machining path data indicating the shape and position of the machining path for forming each of a plurality of layers (step S40).

In response to determining that the first machining route includes at least one of an end point, an intersection point, and a bending point (step S40: Yes), the machining route generation unit 113 generates a second machining route for first shaping a plurality of support points that are based on the end point, intersection point, and/or bending point present on the first machining route, and then shaping a gap line segment connecting the shaped support points (step S50).

In response to determining that the first machining route does not include any of an end point, an intersection point, and a bending point (step S40: No), step S50 is skipped. The machining route generation unit 113 outputs the generated machining route to the machining program generation unit 114. Here, the machining route generation unit 113 outputs the second machining route in response to executing step S50, and outputs the first machining route in response to skipping step S50.

The machining program generation unit 114 converts the machining route output by the machining route generation unit 113 into a machining program, and adds modeling codes (step S60). Consequently, a machining program is generated specifying the route along which the machining head 10 is moved to shape the object 18. Modeling codes are commands in a format that can be interpreted by the control device 1 of the 3D printing apparatus 100, and include command information for instructing the 3D printing apparatus 100 on operation values such as the output of laser from the beam nozzle 11, the speed of wire supply from the wire nozzle 12, and the rate of gas flow from the gas nozzle 13. The machining program is, for example, control information described in G-code, a markup language, or the like. The machining program may be generated using a unique programming language that can be interpreted by the control device 1 of the 3D printing apparatus 100.

The procedure illustrated in FIG. 15 can be put otherwise: the machining program generation method includes: a step of acquiring design shape data indicating the shape of the object 18 to be formed; a step of generating a first machining route from the design shape data; a step of extracting an end point, an intersection point, and a bending point from the machining path indicated by the first machining route; a step of generating a second machining route for first shaping support points that are based on the end point, intersection point, and bending point extracted, and then shaping a gap line segment connecting the plurality of support points shaped; and a step of generating a machining program for controlling the 3D printing apparatus 100 according to the machining route.

As described above, with the machining program generation method according to the second embodiment, it is possible to generate a machining program for causing the 3D printing apparatus 100 to shape support points first and then shape a gap line segment connecting the plurality of shaped support points. By using this machining program to control the 3D printing apparatus 100, shaping accuracy can be improved.

Third Embodiment

The third embodiment describes a method for further improving the shaping accuracy of the 3D printing apparatus 100 by adjusting machining conditions for gap line segments. Generally, additive manufacturing often involves finish processing after additive machining, such as grinding and polishing. Therefore, slight differences in shape from the desired shape are often allowed, but it is still desirable to reduce the error between the desired shape and the final shape.

Figure 16:
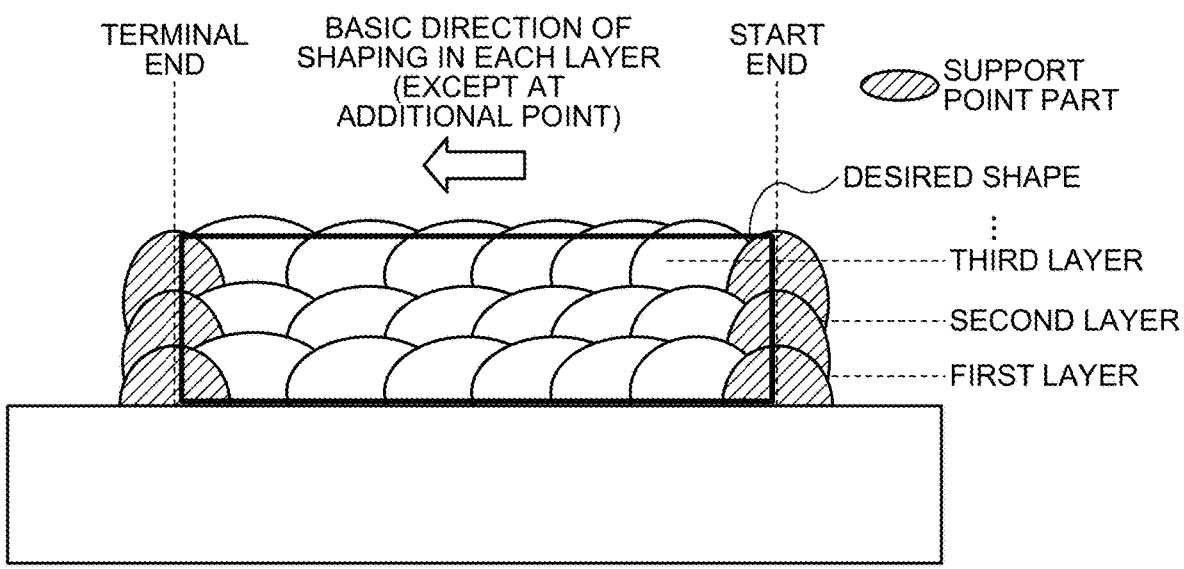
FIG. 16 is a diagram illustrating an example in which a 3D printing apparatus according to a third embodiment of the present invention shapes a gap line segment between a plurality of support points entirely through point shaping.

FIG. 16 is a diagram illustrating an example in which the 3D printing apparatus 100 according to the third embodiment of the present invention shapes a gap line segment between a plurality of support points entirely through point shaping. In the example illustrated in FIG. 16, the gap line segment between the support points and the number of points shaped have an appropriate relationship. However, depending on the length of the gap line segment, it may not be possible to shape the gap line segment with a proper number of ball beads of the same size. In view of this, the machining program generation device 110 adjusts parameters of machining conditions such as the pitch, size, and number of points for shaping a gap line segment between support points in consideration of the shaping position of the support points to be added and the size of ball beads. Consequently, shaping accuracy can be improved, and the object 18 can be prevented from increasing in size. Note that in the case of shaping a gap line segment using line shaping, the length of the line to be shaped may be adjusted.

Machining conditions for gap line segments are conditions for adjusting the amount of machining material to be melted. The machining program generation device 110 adjusts machining conditions such that the amount of machining material to be melted at a position close to an end point of a line bead, e.g. the machining position 26 at a distance of a threshold or less from the end point, is smaller than that at the machining position 26 at a distance exceeding the threshold from the end point. An exemplary machining condition for adjusting the amount of machining material to be melted is laser output, i.e. the output of the laser beam 24. The 3D printing apparatus 100 can reduce the amount of machining material to be melted by reducing the laser output. The 3D printing apparatus 100 can also increase the laser output to increase the amount of heat input to the wire 5, so that the molten line bead has a reduced dynamic viscosity and the solidified line bead has a reduced height. In addition, the machining conditions for adjusting the amount of machining material to be melted may include wire supply speed. By gradually decelerating the wire supply speed as the machining position approaches the end point of the line bead, it is possible to reduce the height of the solidified line bead. In addition, a plurality of machining conditions may be adjusted.

It is desirable that the above-described methods can be selectively used by the machining program generation device 110 or the user according to various restrictions of additive manufacturing. Specifically, it is desirable that the machining program additionally have a function that enables additional settings to add or remove machining conditions that are changed at the end, intersection, and bending points of line beads or the like.

As described above, the method according to the third embodiment makes it possible to further improve the shaping accuracy of the 3D printing apparatus 100 by adjusting machining conditions for shaping gap line segments.

Fourth Embodiment

The fourth embodiment describes a method of generating a machining program using a condition table in which machining conditions for support points are associated with types of machining materials and types of support points. FIG. 17 is a diagram illustrating a process map as an example of a condition table that is used by the machining program generation device 110 according to the fourth embodiment of the present invention.

The process map illustrated in FIG. 17 shows machining conditions including machine parameters and bead data in association with each of the control numbers assigned to different types of machining materials and different types of support points. The machine parameters include the beam diameter of the laser beam 24, axial feed rate, wire supply volume velocity, laser output, wire angle, and the irradiation time of the laser beam 24 for a ball bead. The wire angle is an angle formed by the central axis of the wire 5 with respect to the central axis of the laser beam 24. The bead data include bead width and bead height.

After reading the CAD data 120, the machining route generation unit 113 can automatically select machining conditions with reference to the process map. Consequently, it is possible to save the user's time and effort to input the deposition condition data 130, and thus to reduce the burden on the user in machining program generation processing.

Fifth Embodiment

The fifth embodiment describes a method of automatically generating appropriate machining conditions using a machine learning device 300 that learns procedures for deriving machining conditions.

Figure 18:
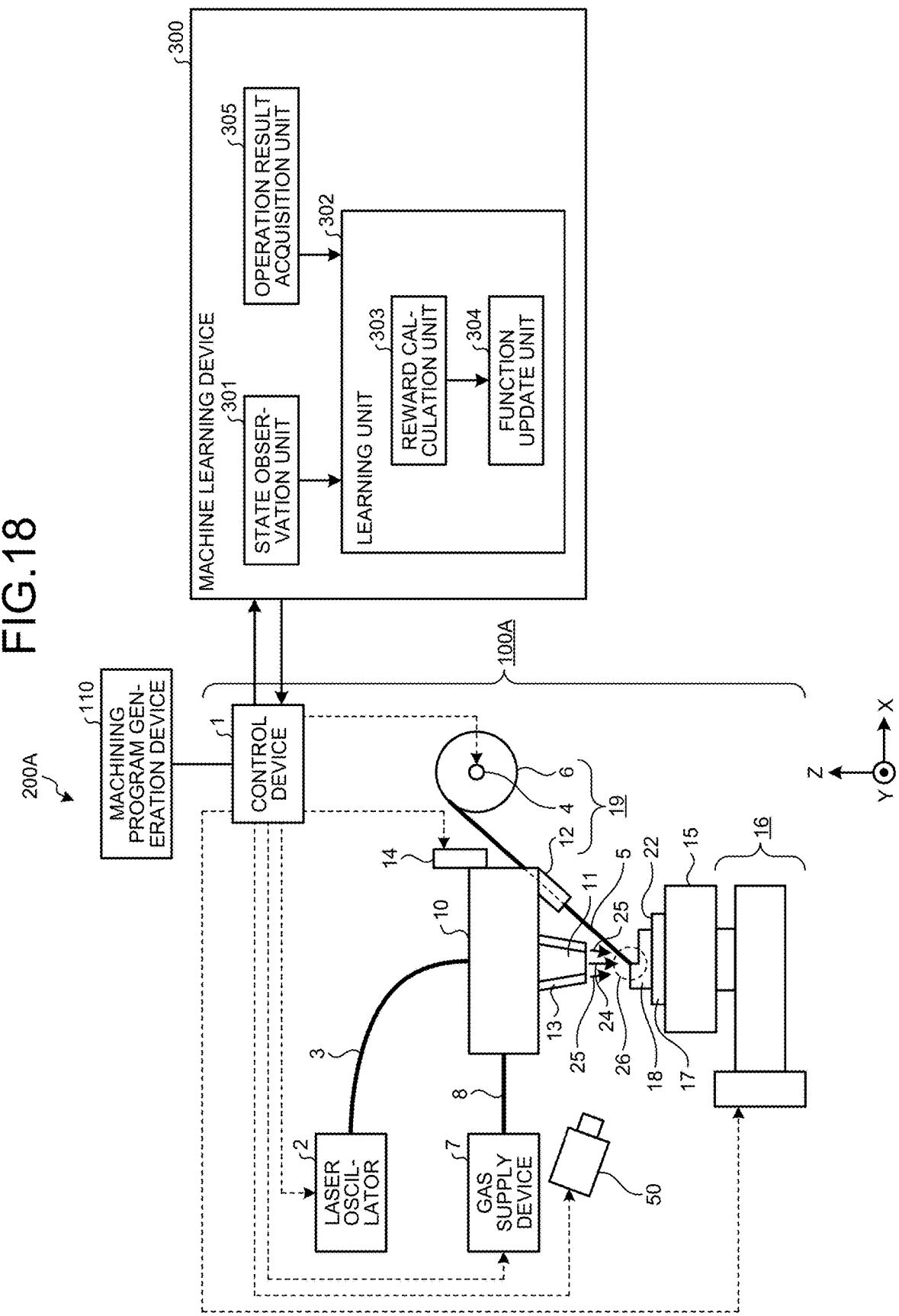
FIG. 18 is a diagram illustrating a configuration of a 3D printing system according to a fifth embodiment of the present invention.

FIG. 18 is a diagram illustrating a configuration of a 3D printing system 200A according to the fifth embodiment of the present invention. The 3D printing system 200A includes a 3D printing apparatus 100A, the machining program generation device 110, and the machine learning device 300.

The 3D printing apparatus 100A includes a height sensor 50 in addition to the components of the 3D printing apparatus 100. Because the components other than the height sensor 50 are similar to those in the first embodiment, a detailed description thereof will be omitted, and differences from the 3D printing apparatus 100 will be mainly described. Because the functions of the machining program generation device 110 are similar to those in the first embodiment, a detailed description thereof will be omitted.

The height sensor 50 of the 3D printing apparatus 100A measures shape information indicating the shape of the object 18 under the control of the control device 1. The height sensor 50 outputs the measurement result to the control device 1. The machine learning device 300 includes a state observation unit 301, a learning unit 302, and an operation result acquisition unit 305. The learning unit 302 includes a reward calculation unit 303 and a function update unit 304.

From the control device 1, the state observation unit 301 observes state quantities of the 3D printing apparatus 100A as state variables, such as drive commands, the amount of wire fed, and the workpiece temperature during shaping. The operation result acquisition unit 305 acquires, as operation results, shape information such as the height of the object 18 and the width of the object 18 at the machining position 26 acquired by an object measurement sensor such as the height sensor 50.

The learning unit 302 collects time-series data including the state variables acquired by the state observation unit 301 and the operation results acquired by the operation result acquisition unit 305, and learns machining conditions such as material for shaping, base material amount, formed shape, laser output, irradiation time, cooling time, and machining routes according to a training data set produced based on the state variables and the operation results.

The learning unit 302 may use any learning algorithm. An exemplary case in which reinforcement learning is applied will be described. Reinforcement learning is a method in which an agent (subject of an action) in an environment observes the current state and determines the action to take. The agent gains a reward from the environment by selecting an action, and learns how to maximize the reward through a series of actions. Q-Learning and TD-Learning are known as representative methods of reinforcement learning. For example, in the case of Q-Learning, a general update expression (action value table) for the action value function Q (s, a) is expressed by Formula (1) below.

[Formula 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In Formula (1), St represents the environment at time t, and $a_t$ represents the action at time t. The action $a_t$ changes the environment to $s_{t+1}$. In addition, $r_{t+1}$ represents the reward that can be gained due to the change of the environment, γ represents a discount rate, and α represents a learning coefficient. In the case where Q-Learning is applied, the action at is machining conditions and a machining route.

The update expression represented by Formula (1) increases the value of the action value function Q when the action value of the best action a at time t+1 is greater than the value of the action value function Q of the action a executed at time t, and otherwise reduces the value of the action value function Q. In other words, the action value function Q (s, a) is updated such that the value of the action value function Q of the action a at time t is brought closer to the best action value at time t+1. As a result, the best action value in a certain environment sequentially propagates to the action values in the previous environments.

The reward calculation unit 303 calculates a reward based on state variables. The reward calculation unit 303 calculates the reward r based on at least one of the machining results such as the surface temperature during shaping, a change in the height of the formed shape in each layer, and surface roughness. For example, the reward calculation unit 303 increases the reward r if each layer has a small change in height. The reward calculation unit 303 gives a reward of "1", for example. On the other hand, the reward r is reduced if each layer has a large change in height. The reward calculation unit 303 gives a reward of "−1", for example. A change in the height of the formed shape in each layer is extracted using a known method. For example, the height sensor 50 measures and acquires height data while each layer is being shaped.

The function update unit 304 updates a function for determining a machining route according to the reward calculated by the reward calculation unit 303. For example, in the case of Q-Learning, the action value function Q ($s_t$, $a_t$) represented by Formula (1) can be used as a function for machining routes.

Figure 19:
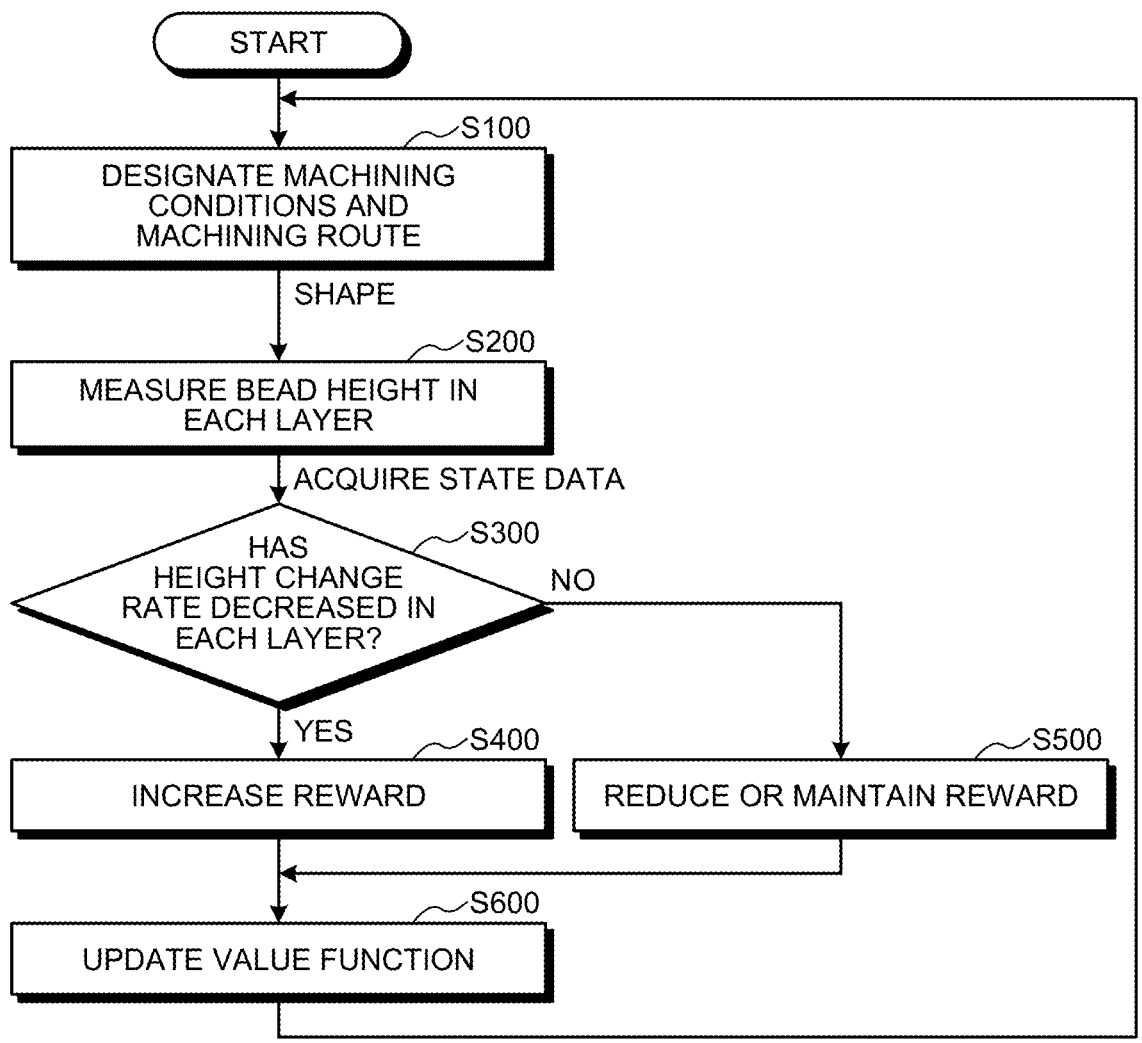
FIG. 19 is a flowchart illustrating an example of the operation of the 3D printing system illustrated in FIG. 18.

FIG. 19 is a flowchart illustrating an example of the operation of the 3D printing system 200A illustrated in FIG. 18. The operation illustrated in FIG. 19 is executed at predetermined control intervals when the 3D printing apparatus 100A performs 3D printing processing on the workpiece.

The control device 1 selects and designates machining conditions and a machining route for the 3D printing apparatus 100A (step S100). The 3D printing apparatus 100A performs 3D printing processing according to the selected machining conditions and machining route.

The height sensor 50 measures the bead height of the shaped part in each layer (step S200). Here, the machine learning device 300 acquires state data and operation results, and the learning unit 302 produces a training data set. The reward calculation unit 303 of the machine learning device 300 compares the height of the object 18 with the height value of the desired shape in each layer, and determines whether the height change rate has decreased (step S300).

In response to determining that the height change rate has decreased (step S300: Yes), that is, the difference between the measurement value of the height of the object 18 and the height value of the desired shape is less than or equal to a threshold, the reward calculation unit 303 increases the reward (step S400). In response to determining that the height change rate has not decreased (step S300: No), that is, the above-described difference is larger than the threshold, the reward calculation unit 303 reduces the reward or maintains the reward as it is (step S500).

The function update unit 304 updates the value function based on the reward calculated by the reward calculation unit 303 (step S600). Note that the reward calculation unit 303 may increase or reduce the reward by a value that varies by step.

Figure 20:
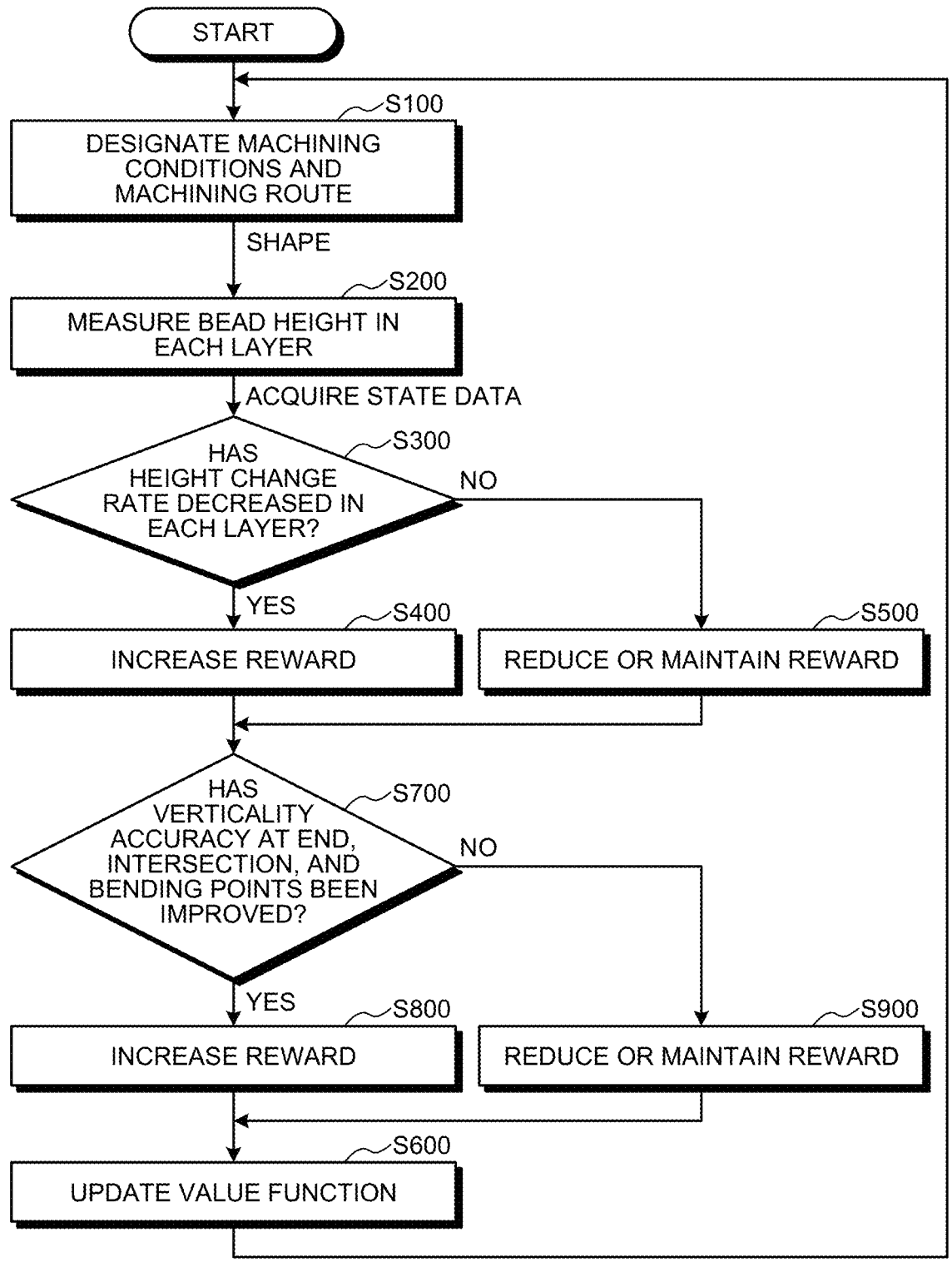
FIG. 20 is a flowchart illustrating a modification of the operation illustrated in FIG. 19.

FIG. 20 is a flowchart illustrating a modification of the operation illustrated in FIG. 19. Hereinafter, differences from FIG. 19 will be mainly described, and the description of steps similar to those in FIG. 19 will be omitted.

The operation illustrated in FIG. 20 additionally includes steps S700, S800, and S900 between steps S400 and S500 and step S600 in FIG. 19.

The basic premise here is that measurement data regarding the vertical accuracy of end, intersection, and bending points have been acquired using the height sensor 50. After step S400 or step S500 is completed, the learning unit 302 compares the vertical accuracy at the end, intersection, and bending points with the value of the vertical accuracy of the desired shape, and determines whether the verticality has been improved (step S700).

In response to determining that the verticality has been improved (step S700: Yes), that is, the difference between the vertical accuracy indicated by the measurement data and the vertical accuracy of the desired shape is less than or equal to a threshold, the reward calculation unit 303 increases the reward (step S800).

In response to determining that the verticality has not been improved (step S700: No), that is, the above-described difference is larger than the threshold, the reward calculation unit 303 reduces the reward or maintains the reward as it is (step S900). After step S800 or step S900 is completed, the operation proceeds to step S600.

Although reinforcement learning is used in the above-described examples, the machine learning device 300 may execute machine learning according to another known method, e.g. a neural network, genetic programming, functional theory programming, or a support vector machine.

In addition, the machine learning device 300, which is used to learn 3D printing routes, machining conditions, and the like from the 3D printing apparatus 100A, may be connected to the 3D printing apparatus 100A via a network, for example. Alternatively, the machine learning device 300 may be incorporated in the 3D printing apparatus 100A. Still alternatively, the machine learning device 300 may exist on a cloud server.

In FIG. 18, the machine learning device 300 is connected to one 3D printing apparatus 100A, but the machine learning device 300 may be connected to a plurality of 3D printing apparatuses 100A. In this case, the plurality of 3D printing apparatuses 100A connected to the machine learning device 300 may be a plurality of 3D printing apparatuses 100A that are used at the same site, or may be 3D printing apparatuses 100A that operate independently at different sites. Furthermore, the machine learning device 300 may add a new 3D printing apparatus 100A to a list of 3D printing apparatuses 100A from which the machine learning device 300 collects data sets, and can remove some 3D printing apparatus 100A from the list. Furthermore, the machine learning device 300 that has learned machining routes, machining conditions, and the like from some 3D printing apparatus 100A may be attached to a different 3D printing apparatus 100A so as to relearn machining routes, machining conditions, and the like to update the learning results. The machine learning device 300 or machine learning results may be incorporated for use into CAM software that generates machining routes, machining conditions, and the like based on the CAD data 120.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1 control device; 2 laser oscillator; 3 fiber cable; 4 rotary motor; 5 wire; 6 wire spool; 7 gas supply device; 8 pipe; 10 machining head; 11 beam nozzle; 12 wire nozzle; 13 gas nozzle; 14 head drive device; 15 stage; 16 rotation mechanism; 16a rotation member; 17 base material; 18 object; 19 wire supply unit; 22 target surface; 24 laser beam; 25 shield gas; 26 machining position; 41 CPU; 42 RAM; 43 ROM; 44 external storage device; 45 input/output interface; 46 bus; 47 processing circuitry; 50 height sensor; 100, 100A 3D printing apparatus; 110 machining program generation device; 111 data input unit; 112 data storage unit; 113 machining route generation unit; 114 machining program generation unit; 120 CAD data; 130 deposition condition data; 200, 200A 3D printing system; 300 machine learning device; 301 state observation unit; 302 learning unit; 303 reward calculation unit; 304 function update unit; 305 operation result acquisition unit.

The invention claimed is:

1. A 3D printing apparatus that forms an object by stacking a plurality of layers including a bead obtained by adding a machining material melted to a target surface while moving a machining position along a machining path, the 3D printing apparatus comprising:
a material nozzle to supply the machining material to the machining position;
a machining head to irradiate the machining position with a beam for melting the machining material supplied from the material nozzle; and
a control circuitry to control the machining head to first shape a plurality of support points that are based on an end point, an intersection point, and a bending point of the machining path for forming each of the plurality of layers, and then shape a gap line segment connecting the plurality of support points shaped.

2. The 3D printing apparatus according to claim 1, wherein the control circuitry first shapes the support points with a bead having a ball shape and then shapes the gap line segment with a bead having a ball shape and/or a bead having a line shape.

3. The 3D printing apparatus according to claim 1, wherein the control circuitry shapes the gap line segment entirely with beads having a ball shape.

4. The 3D printing apparatus according to claim 1, further comprising a machining program generation device to generate a machining program for controlling the 3D printing apparatus, wherein the machining program generation device comprising:
a machining route generation circuitry to extract a plurality of support points that are based on an end point, an intersection point, and a bending point of the machining path from machining path data indicating a shape and a position of the machining path for forming each of the plurality of layers, and generate a machining route by adding, to the machining path, an order of shaping indicating that shaping of the support points is to be executed first and then shaping of a gap line segment connecting the plurality of support points shaped is to be executed; and
a machining program generation circuitry to generate a machining program for controlling the 3D printing apparatus according to the machining route.

5. The 3D printing apparatus according to claim 4, wherein the machining program generation circuitry generates the machining program for first shaping the support points with a bead having a ball shape and then shaping the gap line segment with a bead having a ball shape and/or a bead having a line shape.

6. The 3D printing apparatus according to claim 4, wherein the machining program generation circuitry generates the machining program for shaping the gap line segment entirely with beads having a ball shape.

7. The 3D printing apparatus according to claim 4, further comprising
a memory to store a condition table in which machining conditions for the support points are associated with types of the machining material and types of the support points, wherein
the machining program generation circuitry generates the machining program based on the condition table.

8. The 3D printing apparatus according to claim 4, wherein the machining program generation circuitry adjusts a machining condition for the gap line segment according to the type of the machining material and the type of the support points.

9. The 3D printing apparatus according to claim 7, wherein the machining program generation circuitry adjusts the machining condition such that a smaller amount of the machining material is melted at the machining position when a distance between the machining position and the support points is shorter than a threshold predetermined than when the distance is longer than the threshold.

10. The 3D printing apparatus according to claim 8, wherein the machining program generation circuitry adjusts the machining condition such that a smaller amount of the machining material is melted at the machining position when a distance between the machining position and the support points is shorter than a threshold predetermined than when the distance is longer than the threshold.

11. The 3D printing apparatus according to claim 9, wherein the machining condition for adjusting the amount of the machining material to be melted includes at least one of bead pitch, bead size, and number of beads to be shaped.

12. The 3D printing apparatus according to claim 10, wherein the machining condition for adjusting the amount of the machining material to be melted includes at least one of bead pitch, bead size, and number of beads to be shaped.

13. A 3D printing method using a 3D printing apparatus that forms an object by stacking a plurality of layers including a bead obtained by adding a machining material melted to a target surface while moving a machining position along a machining path, the 3D printing method comprising:

stacking, by the 3D printing apparatus, a plurality of layers by repeating a shaping of a layer including the bead, wherein the shaping includes:

a first shaping of, with a bead having a ball shape, a plurality of support points that are based on an end point, an intersection point, and a bending point of the machining path for forming each layer; and a second shaping of a gap line segment connecting the plurality of support points shaped in the first shaping.

14. A machine learning device that learns a machining condition of the 3D printing apparatus according to claim 1, the machine learning device comprising:

a state observation circuitry to observe machining condition data of the 3D printing apparatus as a state variable;

an operation result acquisition circuitry to acquire, as an operation result, a shape measurement result of an object formed by the 3D printing apparatus; and a learning circuitry to learn the machining condition of the 3D printing apparatus based on a training data set produced based on the state variable and the operation result.

* * * * *